(12) United States Patent
Ishii (10) Patent No.: US 7,804,548 B2
(45) Date of Patent: Sep. 28, 2010

(54) ELECTRO-OPTICAL DEVICE, METHOD OF DRIVING THE SAME, AND ELECTRONIC APPARATUS

(75) Inventor: Tatsuya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 1153 days.

(21) Appl. No.: 11/421,952

(22) Filed: Jun. 2, 2006

(65) Prior Publication Data

US 2006/0274172 A1     Dec. 7, 2006

(30) Foreign Application Priority Data

Jun. 6, 2005  (JP) .............................. 2005-166087
May 1, 2006  (JP) .............................. 2006-127585

(51) Int. Cl.
  *H04N 3/14*  (2006.01)
  *G09G 3/36*  (2006.01)
(52) U.S. Cl. ........................ 348/792; 345/100; 345/103
(58) Field of Classification Search ......... 348/790–792; 345/103, 87, 89, 90, 92, 98, 100, 102, 104
  See application file for complete search history.

(56) References Cited

U.S. PATENT DOCUMENTS 6,731,266 B1 * 5/2004 Jung ........................... 345/103
6,806,862 B1 * 10/2004 Zhang et al. ................. 345/103

FOREIGN PATENT DOCUMENTS

JP    A-2000-112437    4/2000

* cited by examiner

*Primary Examiner*—M. Lee
(74) *Attorney, Agent, or Firm*—Oliff & Berridge, PLC (57) ABSTRACT

An electro-optical device includes: a plurality of scanning lines; a plurality of data lines which are divided into blocks each composed of m data lines (m is an integer equal to or larger than 2); pixels which are provided at intersections of the plurality of scanning lines and the plurality of data lines and each of which emits light at a gray-scale level designated by a data signal sampled to the data line when the scanning line is selected; a scanning line driving circuit which selects at least one of the scanning lines in a horizontal scanning period; a sampling signal output circuit which outputs sampling signals for sequentially selecting the blocks in the horizontal scanning period; a rotation circuit which inputs the data signals to m pixels corresponding to the selected scanning line and the data lines belonging to the selected block and distributes the input data signals corresponding to the m pixels to m image signal lines according to a correspondence prescribed by one or more predetermined control signals; and sampling switches each of which is provided to the data line and samples the data signals distributed to the m image signal lines to the m data lines belonging to one block on the basis of the sampling signal.

8 Claims, 9 Drawing Sheets

| A1 | A0 | | |
|---|---|---|---|
| L | L | Vd1 → Vd1a | |
| | | Vd2 → Vd2a | |
| | | Vd3 → Vd3a | |
| | | Vd4 → Vd4a | |
| L | H | Vd1 → Vd4a | |
| | | Vd2 → Vd1a | |
| | | Vd3 → Vd2a | |
| | | Vd4 → Vd3a | |
| H | L | Vd1 → Vd3a | |
| | | Vd2 → Vd4a | |
| | | Vd3 → Vd1a | |
| | | Vd4 → Vd2a | |
| H | H | Vd1 → Vd2a | |
| | | Vd2 → Vd3a | |
| | | Vd3 → Vd4a | |
| | | Vd4 → Vd1a | |

FIG. 5B

| A1 | A0 | | |
|---|---|---|---|
| L | L | Vid1a → Vid1b | |
| | | Vid2a → Vid2b | |
| | | Vid3a → Vid3b | |
| B1=H | | Vid4a → Vid4b | |
| L | H | Vid1a → Vid2b | |
| | | Vid2a → Vid3b | |
| | | Vid3a → Vid4b | |
| B2=H | | Vid4a → Vid1b | |
| H | L | Vid1a → Vid3b | |
| | | Vid2a → Vid4b | |
| | | Vid3a → Vid1b | |
| B3=H | | Vid4a → Vid2b | |
| H | H | Vid1a → Vid4b | |
| | | Vid2a → Vid1b | |
| | | Vid3a → Vid2b | |
| B4=H | | Vid4a → Vid3b | |

ELECTRO-OPTICAL DEVICE, METHOD OF DRIVING THE SAME, AND ELECTRONIC APPARATUS

BACKGROUND

1. Technical Field

The present invention relates to a technique for preventing display quality from being deteriorated when data signals whose phases are expanded are sampled.

2. Related Art

In recent years, projectors for forming a small image by using a display panel, such as a liquid crystal panel, and enlarging and projecting the small image by using an optical system have been widespread use. The projector does not have a function of forming an image, but is supplied with image data (or image signals) from a host device, such as a personal computer or a television tuner. The image data designates the gray-scale levels (brightness) of pixels, and is supplied to horizontally and vertically scan the pixels that are arranged in a matrix. Therefore, the image data is suitable for driving the display panel provided in the projector. In general, the display panel used for the projector is driven by a dot sequential method of sequentially selecting the scanning lines one-by-one, of sequentially selecting data lines one-by-one in a period where one scanning line is selected, of converting the image data into data signals suitable for driving liquid crystal, and of supplying the converted data signals to the selected data line.

Meanwhile, in recent years, there has been proposed a technique for improving the resolution of a display image. A high-resolution display image can be achieved by increasing the number of scanning lines and the number of data lines. However, in this case, since a frame frequency is fixed, the larger the number of scanning lines is, the shorter one horizontal scanning period becomes. In addition, in the dot sequential method, the larger the number of data lines becomes, the shorter the period where the data lines are selected becomes. Therefore, in the dot sequential method, it is difficult to secure sufficient time to supply the data signals to the data lines as the resolution of displayed images improves, which results in insufficient writing of the image signals onto the pixels.

Therefore, in order to solve the problem of insufficient writing, there has been suggested a phase-expansion driving method (see JP-A-2000-112437). In the phase-expansion driving method, blocks each composed of a predetermined number of data lines, for example, four data lines (six data lines in JP-A-2000-112437), are sequentially selected in one horizontal scanning period in a predetermined order, and data signals expanded four times in the time axis direction are supplied to the four data lines belonging to the selected block. In the phase-expansion driving method, it is possible to secure time required to supply the data signals to the data lines that is, for example, four times longer than that in the dot-sequential method. Thus, the phase-expansion driving method is suitable for improving the resolution of a displayed image.

Therefore, in the phase-expansion driving method, due to the data signals which are expanded four times along the time axis, the pixels arranged in every four rows corresponding to one frame have slightly different gray-scale levels, that is, strip-shaped color unevenness occurs, resulting in the deterioration of display quality.

SUMMARY

An advantage of some aspects of the invention is that it provides an electro-optical device which uses a phase-expansion driving method and is capable of preventing display quality from being deteriorated, a method of driving the same, and an electronic apparatus.

According to an aspect of the invention, an electro-optical device includes: a plurality of scanning lines; a plurality of data lines which are divided into blocks each composed of m data lines (m is an integer equal to or larger than 2); pixels corresponding to intersections of the plurality of scanning lines and the plurality of data lines; a scanning line driving circuit which selects at least one of the scanning lines in a horizontal scanning period; a sampling signal output circuit which outputs sampling signals for sequentially selecting the blocks in the horizontal scanning period; a rotation circuit which receives data signals corresponding to m pixels corresponding to the selected scanning line and the data lines belonging to the selected block and distributes the data signals to m image signal lines according to a correspondence prescribed by one or more predetermined control signals; and sampling switches each of which is provided to the data line and samples the data signals distributed to the m image signal lines to the m data lines belonging to the selected block on the basis of the sampling signal.

According to this structure, even when the impedances of supply paths of the data signals are different from each other, it is possible to reduce the influence of the difference to the minimum by changing the correspondence between the input data signals corresponding to the m pixels and the m image signal lines for supplying the data signals.

In the electro-optical device according to this aspect, preferably, the rotation circuit includes: a decoder which detects m combinations of logical levels of the one or more control signals; and a multiplexer which distributes the data signals corresponding to the m pixels to the m image signal lines as m different signals according to the result detected by the decoder.

In the above-mentioned structure, it is preferable that the multiplexer include m-by-m transmission gates. In addition, preferably, each of the transmission gates is a p-channel or n-channel transistor, or a parallel circuit of the p-channel transistor and the n-channel transistor.

Further, in the electro-optical device according to this aspect, the correspondence prescribed by the one or more control signals may be changed according to a predetermined rule, or it may be changed randomly.

Furthermore, in the electro-optical device according to this aspect, it is preferable that dummy image signal lines be provided at both sides of the m image signal lines.

Further, the invention can be applied to a method of driving an electro-optical device.

According to another aspect of the invention, an electronic apparatus includes the above-mentioned electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
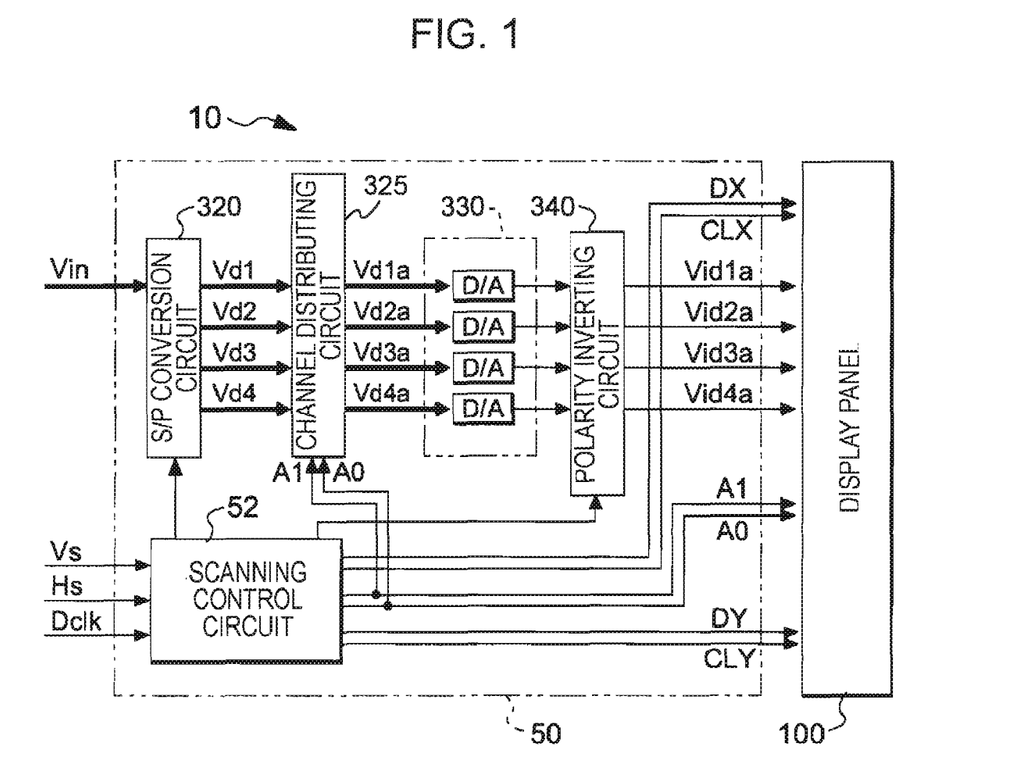
FIG. 1 is a block diagram illustrating the overall structure of an electro-optical device according to an embodiment of the invention.

Hereinafter, preferred embodiments of the invention will be described with reference to the accompanying drawings. FIG. 1 is a block diagram illustrating the overall structure of an electro-optical device according an embodiment of the invention.

As shown in FIG. 1, an electro-optical device 10 includes a processing circuit 50 and a display panel 100. The process circuit 50 is a circuit module that is mounted on a printed substrate to control the driving of the display panel 100, and is connected to the display panel 100 by, for example, a flexible printed circuit substrate.

Further, the processing circuit 50 includes a scanning control circuit 52, a serial-to-parallel (S/P) conversion circuit 320, a channel distributing circuit 325, a digital-to-analog (D/A) conversion circuit group 330, and a polarity inverting circuit 340.

Figure 6:
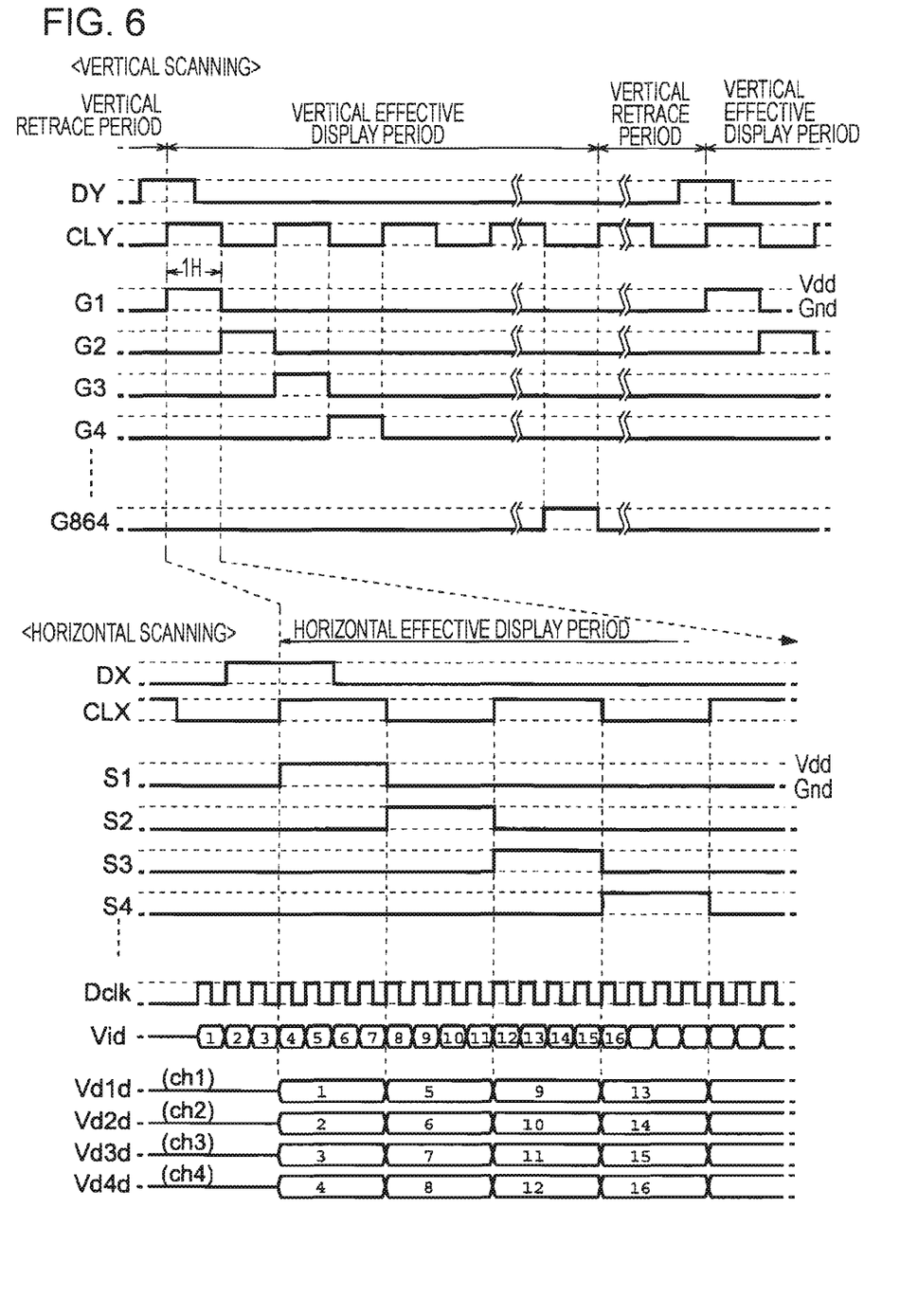
FIG. 6 is a timing chart illustrating the operation of the electro-optical device.

The S/P conversion circuit 320 expands image data Vin supplied from an upper level device (not shown) four times along the time axis in synchronization with a vertical scanning signal Vs, a horizontal scanning signal Hs, and a dot clock signal Dclk, as shown in FIG. 6, distributes the expanded data as image data Vd1 to Vd4, and outputs the image data to every four pixels with the phases thereof matched with each other.

The image data Vin is digital data designating the gray-scale level (brightness) of a pixel. More specifically, in a horizontal effective scanning period, image data are sequentially supplied to first, second, third, fourth, fifth, sixth, seventh, eighth, ninth, tenth, eleventh, twelfth, . . . , 1149-th, 1150-th, 1151-th, and 1152-th pixels which are included in a selected row, in synchronism with the dot clock signal Dclk.

In this case, the image data Vin is output to the first, fifth, ninth, . . . , 1149-th pixels as image data Vd1. The image data Vin is output to the second, sixth, tenth, 1150-th pixels as image data Vd2. The image data Vin is output to the third, seventh, eleventh, . . . , 1151-th pixels as image data Vd3. The image data Vin is output to the fourth, eighth, twelfth, . . . , 1152-th pixels as image data Vd4.

The image data Vin is not supplied in a retrace period. Therefore, the S/P conversion circuit 320 replaces the image data with data for causing the pixel to appear to be black and outputs the data as the image data Vd1 to Vd4 in the retrace period.

The channel distributing circuit 325 distributes the image data Vd1 to Vd4 to channels ch1 to ch4 according to horizontal control signals A1 and A0 and outputs them as image data Vd1a to Vd4a.

Figure 5A:
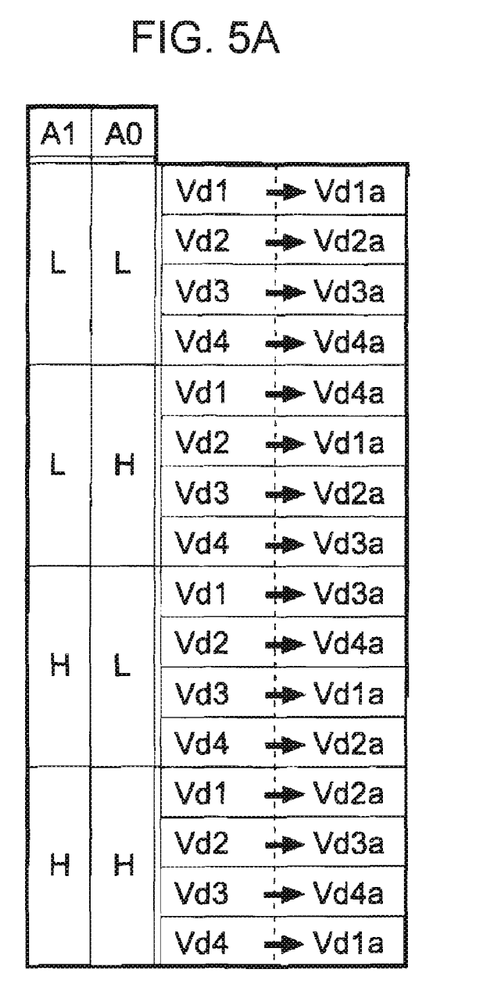
FIGS. 5A and 5B are diagrams illustrating the rotation of the electro-optical device.

In this embodiment, the image data Vd1 to Vd4 are distributed to the channels ch1 to ch4 according to a combination of logical levels L and H of the control signals A1 and A0, as shown in FIG. 5A. For example, when the control signals A1 and A0 are at H and L levels, respectively, the image data Vd1 is output as the image data Vd4a for the channel ch4, and the image data Vd2, Vd3, and Vd4 are output as the image data Vd1a, Vd2a, and Vd3a for the channels ch1, ch2, and ch3, respectively.

The D/A conversion circuit group 330 is a group of D/A converters provided in every channel, and converts the image data Vd1a to Vd4a into analog voltages corresponding to gray-scale values.

Further, in this embodiment, serial-to-parallel conversion is performed on the image data Vin, and then the converted image data is further converted into analog image data, but the invention is not limited thereto. For example, the image data may be converted into analog data before the serial-to-parallel conversion.

The polarity inverting circuit 340 converts only the voltage of the converted 4-channel analog signals into a voltage higher than a voltage Vc when the scanning control circuit 52 designates a positive polarity and converts the voltage into a voltage lower than the voltage Vc when the scanning control circuit 52 designates a negative polarity. Then, the polarity inverting circuit 340 outputs the analog signals as data signals Vid1a to Vid4a.

Figure 7:
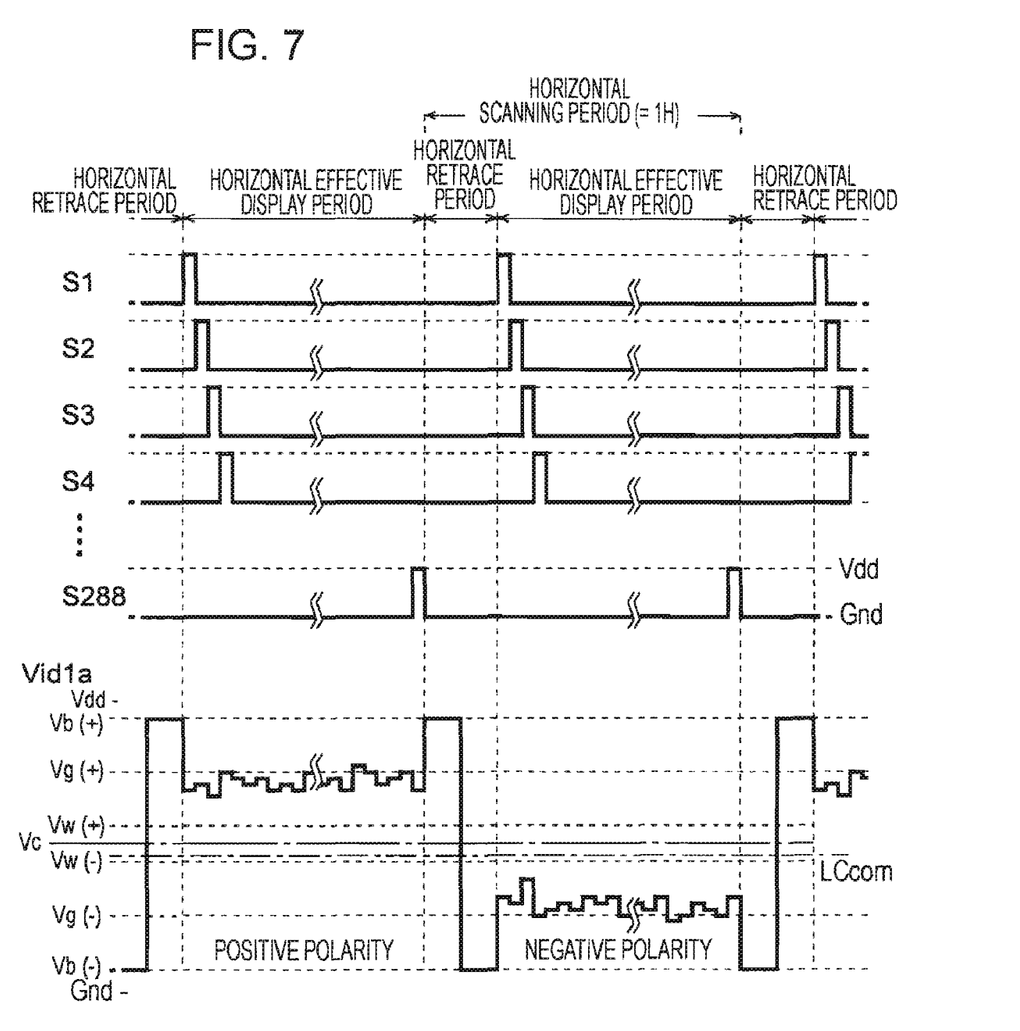
FIG. 7 is a timing chart illustrating the operation of the electro-optical device.

The voltage Vc a central voltage of the amplitude of a data signal, as shown in FIG. 7, which will be described below. The voltage Vc is a substantially intermediate voltage between a ground potential Gnd and a high potential Vdd of a power supply, and is a standard of the polarity of a signal to be written onto a pixel. That is, in this embodiment, when a data signal has a voltage higher than the voltage Vc, the data signal is referred to as a positive data signal. On the other hand, when a data signal has a voltage lower than the voltage Vc, the data signal is referred to as a negative data signal. When a particular description is not made, the ground voltage Gnd of the power supply is used as a reference voltage.

In this case, the polarity inverting circuit 340 inverts the polarity of a data signal in order to alternately drive pixels. The polarities of the pixels may be inverted in one vertical scanning period (frame), for example, (a) for every scanning line, (b) for every data line, (c) for every pixel, or (d) for every frame. In this embodiment, the polarities of the pixels are inverted for every scanning line, but the invention is not limited thereto.

The scanning control circuit 52 has a first function of controlling the scanning of the display panel 100, a second function of controlling the S/P conversion circuit 320 to perform a phase expansion in synchronism with the horizontal scanning of the display panel 100, and a third function of generating the control signals A1 and A0 so as to be synchronized with the phase expansion.

According to the first function, on the basis of the dot clock signal Dclk, the vertical scanning signal Vs, and the horizontal scanning signal Hs supplied from a host device, the scanning control circuit 52 generates a transmission starting pulse DX and a clock signal CLX to control the horizontal scanning of the display panel 100 and generates a transmission starting pulse DY and a clock signal CLY to control the vertical scanning of the display panel 100.

Figure 8:
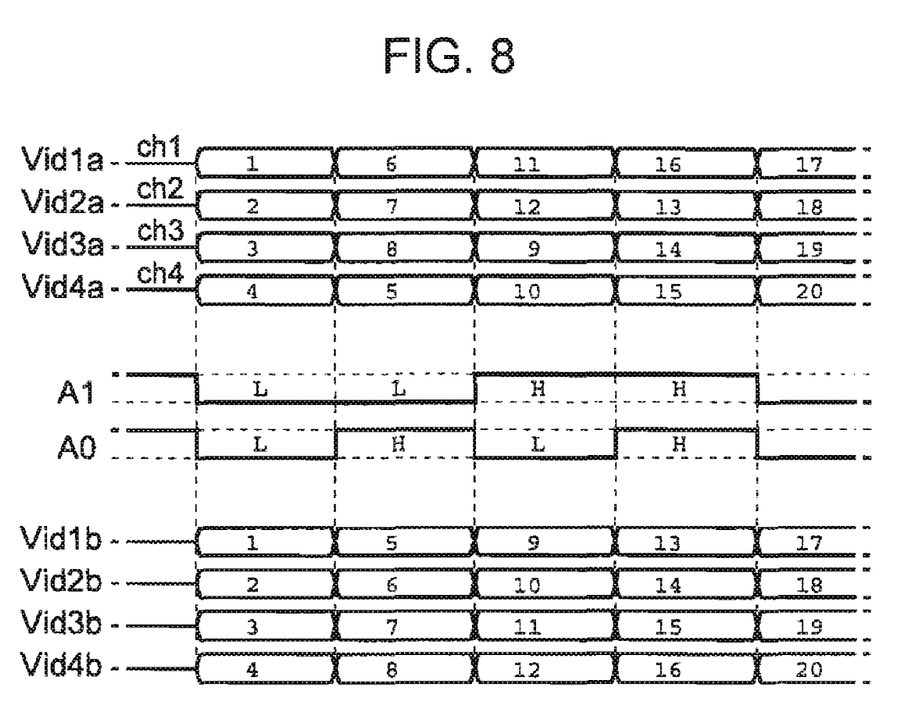
FIG. 8 is a timing chart illustrating the operation of the electro-optical device.

According to the third function, for example, as shown in FIG. 8, the scanning control circuit 52 logically inverts the level of the control signal A1 for every two periods (for every eight pixels) in the phase expansion, and logically inverts the level of the control signal A0 for every period (for every four pixels) in the phase expansion.

Meanwhile, the display panel 100 is formed by bonding an element substrate and a counter substrate having a common electrode formed thereon by a sealing member with a uniform gap therebetween and by injecting liquid crystal into the gap, and forms a predetermined image using an electro-optical change of the liquid crystal.

Figure 2:
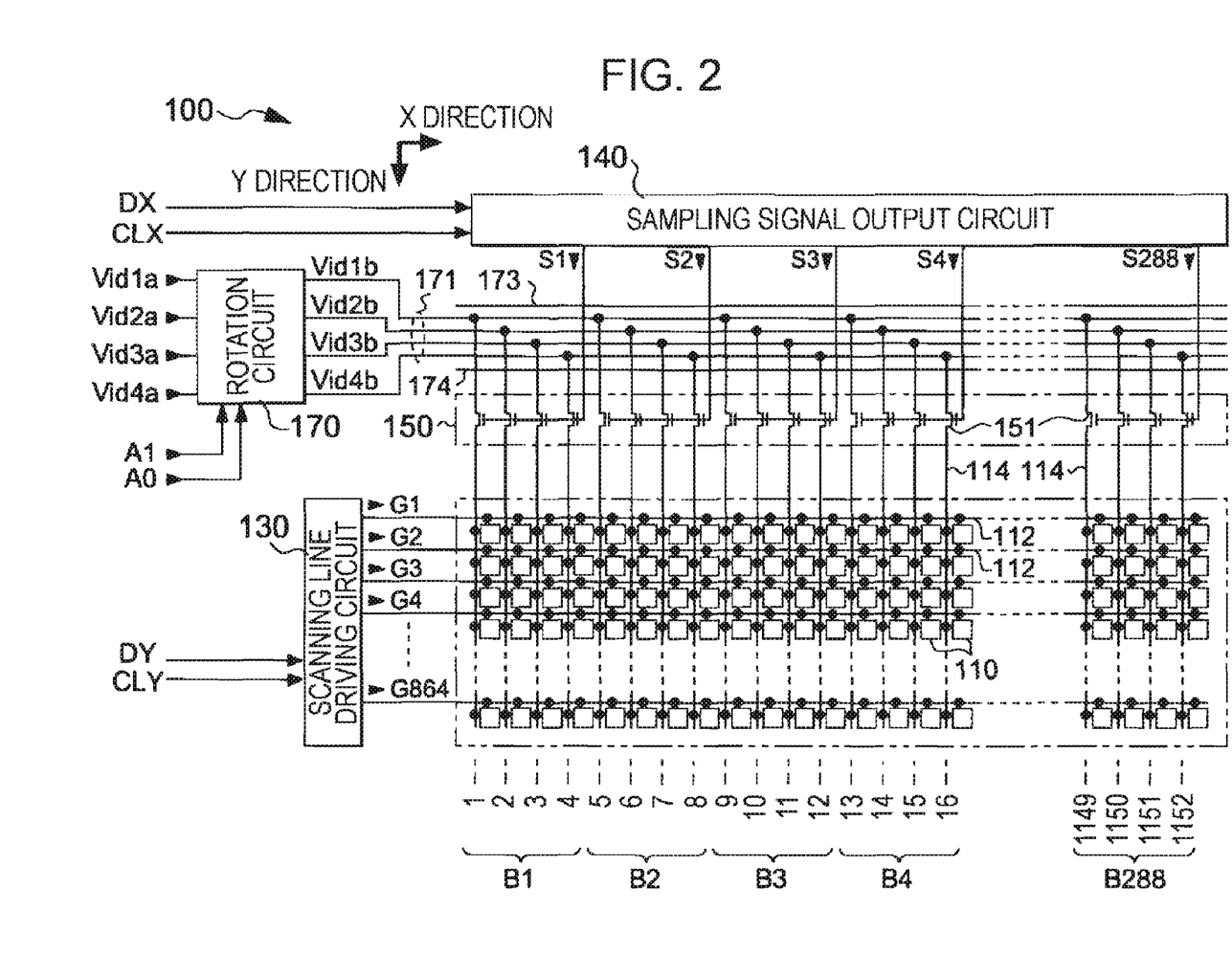
FIG. 2 is a diagram illustrating the structure of a display panel of the electro-optical device.

As shown in FIG. 2, in the display panel 100, 864 rows of scanning lines 112 extend in the X direction (the horizontal direction) and 1152 columns of data lines 114 extend in the Y direction (the vertical direction). Pixels 110 are provided so as to correspond to intersections of the scanning lines 112 and the data lines 114. Therefore, in this embodiment, the pixels 110 are arranged in a matrix of 864 rows by 1152 columns in a display region 100*a*, but the invention is not limited thereto.

Further, in this embodiment, the 1152 data lines 114 are divided into 288 blocks each composed of 4 data lines. For the convenience of description, first, second, third, . . . , 288-th blocks from the left side are represented by blocks B1, B2, B3, . . . , B288, respectively.

Figure 3:
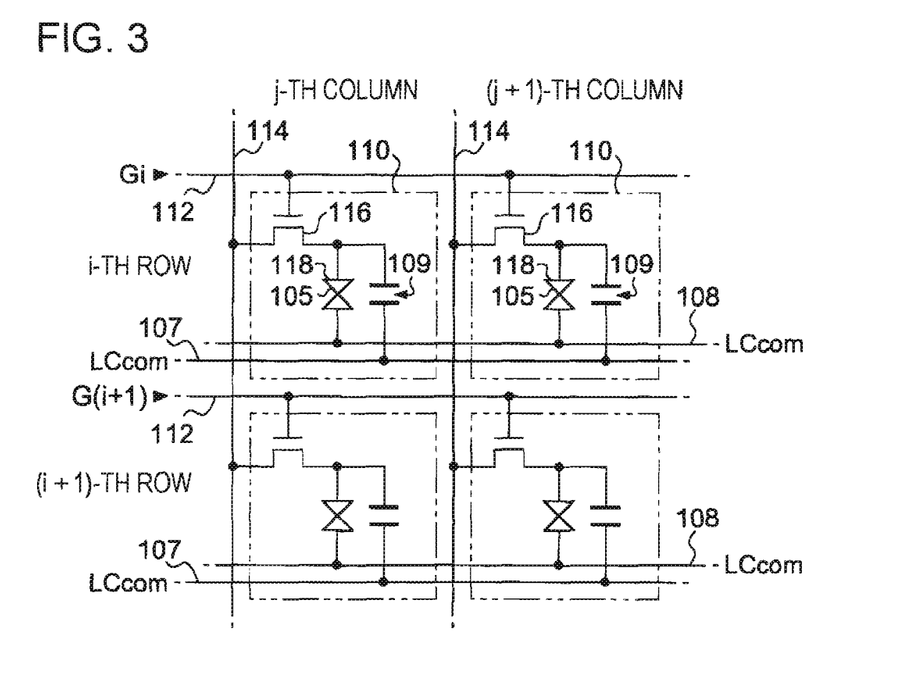
FIG. 3 is a diagram illustrating the structure of pixels of the electro-optical device.

FIG. 3 is a circuit diagram illustrating the detailed structure of the pixels 110 of the display panel 100. More specifically, FIG. 3 shows the structure of four pixels, 2-by-2 pixels corresponding to intersections of i-th and (i+1)-th rows and j-th and (j+1)-th columns. Here, the symbols i and (i+1) indicate rows where the pixels 110 are arranged (i is an integer within the range 1 to 863), and the symbols j and (j+1) indicate columns where the pixels 110 are arranged (j is an integer within the range 1 to 1151).

As shown in FIG. 3, in each of the pixels 110, an n-channel TFT (thin film transistor) 116 has a source connected to the data line 114, a drain connected to a pixel electrode 118, and a gate connected to the scanning line 112.

A common electrode 108 to all the pixels is provided so as to be opposite to the pixel electrodes 118 formed on the element substrate. In addition, liquid crystal 105 is interposed between the pixel electrodes 118 and the common electrode 108. Therefore, a pixel capacitor composed of the pixel electrode 118, the common electrode 108, and the liquid crystal 105 is provided in each pixel.

A voltage LCcom which is uniform over time is applied to the common electrode 108. In this embodiment, the voltage (potential is equal to a reference voltage Vc. However, the voltage may be set to a level slightly lower than that level of the reference voltage Vc, which will be described below.

Although not particularly shown in the drawings, alignment films are provided on surfaces of the two substrates facing each other, and polarizers are provided on the other surfaces of the two substrates opposite to each other along the alignment direction. A rubbing process is performed on the alignment films to cause the longitudinal directions of liquid crystal molecules to be continuously twisted, for example, at an angle of 90° between the two substrates.

When a voltage having an effective value of 0 is applied to the pixel capacitor, light passing between the pixel electrode 118 and the common electrode 108 is optically rotated at an angle of about 90° along the twisted liquid crystal molecules. As the effective value of the voltage becomes higher, the liquid crystal molecules are inclined in the direction of an electric field, causing the optical rotation of light to be removed. Therefore, for example, in a transmissive liquid crystal display device in which the polarizers are provided on the incident side and the rear size of the liquid crystal display device such that polarizing axes are aligned with the alignment direction, when the effective value of the voltage is close to zero, the maximum transmittance of light is obtained, resulting in white display. On the other hand, the larger the effective value of the voltage becomes, the smaller the transmission amount of light becomes, resulting in black display where the minimum transmittance of light is obtained (normally white mode).

In addition, in order to reduce the amount of charge leaking from the pixel capacitor through the TFT 116 when the TFT 116 is turned off, a storage capacitor 109 is provided in each pixel. One end of the storage capacitor 109 is connected to the pixel electrode 118 (the drain of the TFT 116), and the other end thereof is connected to a capacitor line 107. The capacitor line 107 is not shown in FIG. 2, but the same voltage LCcom as that applied to the common electrode 108 is applied to the capacitor line 107 in this embodiment. More specifically, the capacitor line 107 is formed on the element substrate, and the common electrode 108 is formed on the counter substrate. In addition, the capacitor line 107 and the common electrode 108 are electrically connected to each other by a conductive member (not shown). Therefore, in each pixel 110, the pixel capacitor and the storage capacitor are connected in parallel to the pixel electrode 118 (the drain of the TFT 116) and the common electrode 108.

The TFT 116 of the pixel 110 is formed in the same manufacturing process as that in which a scanning line driving circuit 130 or a sampling signal output circuit 140, which will be described below, is formed, which contributes to reducing the overall size and manufacturing costs of a device.

In FIG. 2, peripheral circuits, such as the scanning line driving circuit 130 and the sampling signal output circuit 140, are provided around the periphery of the display region 100*a* where the pixels 110 are arranged.

The scanning line driving circuit 130 supplies scanning signals G1, G2, G3, . . . , G864 to 1st, 2nd, 3rd, 864th scanning lines 112, respectively. A detailed description of the scanning line driving circuit 130 will be omitted since the invention is not directly related to the scanning line driving circuit 130. Thus, the structure of the scanning line driving circuit 130 will be briefly described below. As shown in FIG. 6, the scanning line driving circuit 130 sequentially shifts the transmission starting pulse DY that is supplied at the beginning of each vertical effective display period and has a pulse width (H level) corresponding to a half period of the clock signal CLY whenever the level of the clock signal CLY changes (rises or is lowered) to generate the scanning signals G1, G2, G3, . . . , G864, and outputs the generated signals.

In this embodiment, a horizontal scanning period is divided into a vertical retrace period and a vertical effective display period subsequent to the vertical retrace period. As shown in FIG. 6, the vertical effective display period is from a point of time when the scanning signal G1 turns to an H level to a point of time when the scanning signal G864 is retraced to an L level, and the vertical retrace period is a period other than the vertical effective display period of the vertical scanning period.

Next, as shown in FIG. 6 or 7, the sampling signal output circuit 140 sequentially shifts the transmission starting pulse DX that is supplied at the beginning of the horizontal effective display period and has a pulse width (H level) corresponding to about one period of the clock signal CLX whenever the level of the clock signal CLX changes to generate sampling signals S1, S2, S3, . . . , S288, and outputs the generated signals. That is, the sampling signals S1, S2, S3, ..., S288 sequentially exclusively turn to H levels in the horizontal effective display period.

In this embodiment, a horizontal scanning period is divided into a horizontal retrace period and a horizontal effective display period subsequent to the horizontal retrace period. As shown in FIG. 7, the horizontal effective display period is from a point of time when the sampling signal S1 turns to an H level to a point of time when the sampling signal S288 turns to an L level, and the horizontal retrace period is a period other than the horizontal effective display period of the horizontal scanning period.

Meanwhile, the rotation circuit 170 allocates the data signal Vid1a to Vid4a of the channels ch1 to ch4 to four image signal lines 171 on the basis of the control signals A1 and A0.

For the convenience of explanation, a signal allocated to a first image signal line 171 from the upper side of FIG. 2 is referred to as data signal Vid1b, and similarly, signals allocated to second to fourth image signal lines 171 are referred to as data signals Vid2b to Vid4b.

In the display panel 100, the four image signal lines 171 are wiring lines that have the same length and are arranged at the same pitch. In addition, dummy image signal lines 173 and 174 are provided upper and lower sides of the four image signal lines 171 so as to have the same length and pitch as those of the four image signal lines 171.

When the dummy image signal lines 173 and 174 are not provided, the first and fourth image signal lines 171 are provided on both sides of the second and third image signal lines 171, but no image signal line 171 is provided on one side, the upper or lower side, of each of the first and fourth image signal lines 171, which causes the parasitic capacitance of the four image signal lines 171 to be non-uniform.

Therefore, the dummy image signal line 173 is provided on the upper side of the first image signal line 171, and the dummy image signal line 174 is provided on the lower side of the fourth image signal line 171, in order to make the parasitic capacitance of the four image signal lines 171 uniform and to prevent noises from being input to the image signal lines 171.

Figure 4:
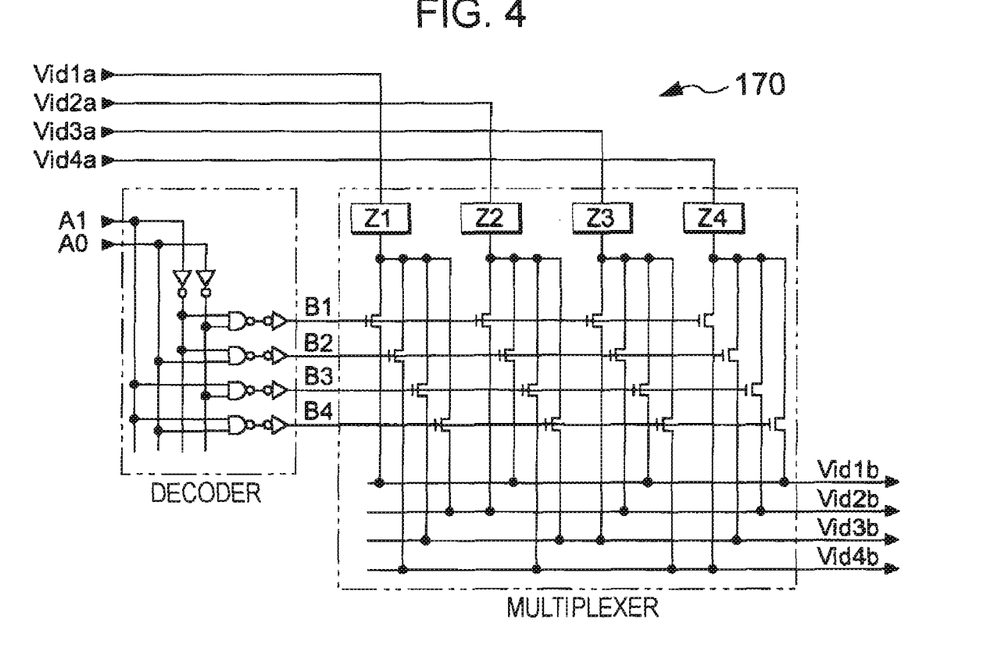
FIG. 4 is a diagram illustrating the structure of a rotation circuit of the electro-optical device.

The rotation circuit 170 will be described in detail with reference to FIG. 4. As shown in FIG. 4, the rotation circuit 170 includes a decoder which decodes four combinations of logical levels of the control signals A1 and A0 and outputs signals B1 to B4 any one of which turns to an H level according to the decode result and a multiplexer which branches the data signals Vid1a to Vid4a into four paths so as to correspond to the signals B1 to B4, selects one of the branched paths which is at an H level, and allocates the signals to the four image signal lines 171 according to a predetermined rule, and outputs the signals as the data signals Vid1b to Vid4b.

The multiplexer includes 16 n-channel TFTs serving as transmission gates provided in 16 branched paths of the data signals Vid1a to Vid4a.

Each of the TFTs is designed to have a size which enables the image signal line 171 having a relative large parasitic capacitance to be charged or discharged at a predetermined speed.

Next, a method of allocating the data signals Vid1a to Vid4a to the data signals Vid1b to Vid4b according to the combinations (the output of the signals B1 to B4) of the logical levels of the control signals A1 and A0 will be described below with reference to FIG. 5B.

Figure 5B:
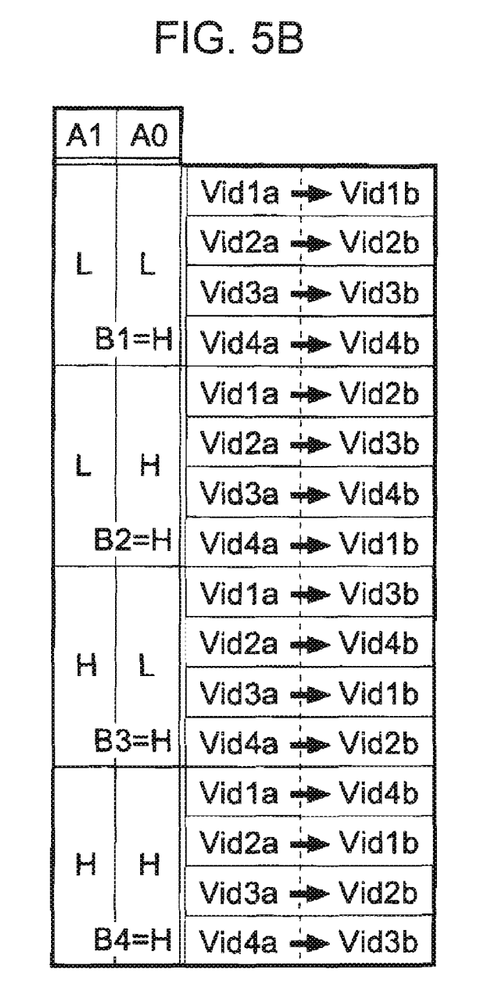

As shown in FIG. 5B, for example, when the control signals A1 and A0 are at L and H levels, respectively, the data signal Vid1a is supplied to the second image signal line 171 as the data signal Vid2b, and the data signals Vid2a, Vid3a, and Vid4a are supplied to the third, fourth, and first image signal lines 171 as the data signals Vid3b, Vid4b, and Vid1b, respectively.

In this embodiment, how the channel distributing circuit 325 distributes signals according to the combinations of the logical levels of the control signals A1 and A0 will be described with reference to FIG. 5A, and how the rotation circuit 170 distributes signals will be described with reference to FIG. 5B. The data signal Vid1b is always supplied to the first image signal line 171 on the basis of the image data Vd1 immediately after phase expansion, and the data signals Vid2b to Vid4b are always supplied to the second to fourth image signal lines 171 on the basis of the image data Vd2 to Vd4, respectively.

That is, in this embodiment, the channel distributing circuit distributes the image data Vd1 to Vd4 immediately after phase expansion according to the combination of the logical levels of the control signals A1 and A0, and then analog conversion and polarity conversion are performed on the distributed signals. In addition, paths to the input terminal of the rotation circuit 170 are different from each other in the display panel, but a fixed correspondence is established between the image data Vd1 to Vd4 and the data signals Vid1b and Vid4b, regardless of the combination of the logical level of the control signals A1 and A0 (see FIG. 8)

Further, for the convenience of explanation, impedances of supply lines, channels ch1 to ch4, from connecting terminals of the display panel 100 to an FPC to the rotation circuit 170 are represented by Z1 to Z4 in FIG. 4.

The sampling circuit 150 is an aggregation of sampling switches 151 provided in the data lines 114. Each of the sampling switches 151 is an n-channel TFT having a drain connected to the data line 114.

A common sampling signal is supplied to gates of four sampling switches 151 corresponding to the data lines 114 belonging to the same block. For examples a common sampling signal S4 corresponding to a block B4 is supplied to the gates of four sampling switches 151 corresponding to thirteenth to sixteenth data lines 114 belonging to the block B4.

The source of the sampling switch 151 is connected to any one of four image signal lines 171 supplied with the data signals Vid1b to Vid4b from the following relationship.

That is, in the sampling switch 151 having a drain connected to a j-th data line 114 from the left side of FIG. 2, when j is divided by 4 with a remainder of 1, the source of the sampling switch 151 is connected to the first image signal line 171 supplied with the data signal Vid1b. Similarly, in the sampling switches 151 having drains connected to the j-th data line 114, when j is divided by 4 with remainders of 2, 3, and 0, the sources of the sampling switches 151 are connected to the image signal lines 171 supplied with the data signals Vid2b, Vid3b, and Vid4b, respectively. For example, in FIG. 3, in the sampling switch 151 having a drain connected to the eleventh data line 114, the source of the sampling switch 151 is connected to the third image signal line 171 supplied with the data signal Vid3b, since 11 is divided by 4 with a remainder of 3.

When a sampling signal is at an H level, four sampling switches 151 belonging to a block corresponding to the sampling signal are simultaneously turned on, and the data signals Vid1b to Vid4b supplied to the image signal line 171 are sampled to four data lines 114 belonging to the block.

Next, the operation of the electro-optical device 10 will be described below.

First, the transmission starting pulse DY is supplied to the scanning line driving circuit 130 at the beginning of one vertical scanning effective display period. As shown in FIG.

6, the supply of the transmission starting pulse DY causes the scanning signals G1, G2, G3, . . . , G864 to sequentially exclusively turn to H levels in every horizontal scanning period.

A horizontal effective display period where the scanning signal G1 is at an H level will be described below. In the horizontal effective display period, positive writing is performed. In the horizontal effective display period, the image data Vin corresponding to the pixels 110 arranged in the first, second, third, and fourth columns and the first row are supplied, are expanded four times along the time axis, and are then output as image data Vd1 to Vd4.

When the control signals A1 and A0 are at L levels, the channel distributing circuit 325 distributes the image data as shown in FIG. 5A. That is, the image data Vd1 to Vd4 turn to the image data Vd1a to Vd4a, respectively. The image data Vd1a to Vd4a are converted into the data signals Vid1a to Vid4a having voltages higher than those of the image data Vd1a to Vd4a by designated values, using the voltage Vc as a reference voltage, and then the data signals Vid1a to Vid4a are supplied to the display panel 100.

Meanwhile, in the display panel 100, when the control signals A1 and A0 are at the L levels, the rotation circuit 170 distributes the data signals as shown in FIG. 5B. Therefore, the digital signals Vid1a to Vid4a are supplied to the first to fourth image signal lines 171 as the data signals Vid1b to Vid4b.

Further, in a period where data signals corresponding to the pixels 110 in the first to fourth columns and the first row are supplied, only the sampling signal S1 turns to an H level. When the sampling signal S1 turns to the H level, the first to fourth sampling switches 151 belonging to the block B1 are simultaneously turned on, which causes the data signal Vid1b supplied to the image signal line 171 to be sampled to the first data line 114 and the data signals Vid2b to Vid4b to be sampled to the second to fourth data lines 114.

Since the scanning signal G1 is at the H level, all the TFTs 116 having gates connected to the first scanning line 112 are turned on. Therefore, for example, the data signal Vid1b sampled to the first data line 114 is applied to the pixel electrode 118 of a pixel corresponding to an intersection of the first scanning line 112 from the upper side of FIG. 2 and the first data line 114 from the left side of FIG. 2. Similarly, the data signals Vid2b to Vid4b sampled to the second to fourth data lines 114 are applied to the pixel electrodes 118 of the pixels arranged in the second to fourth columns and the first row.

In this structure, the control signals A1 and A0 are at the L levels. However, as described above, since a fixed correspondence is established between the image data Vd1 to Vd4 and the data signals Vid1b to Vid4b, regardless of the combination of the logical levels of the control signals A1 and A0, signals obtained by performing analog conversion and polarity inversion on the image data Vd1 to Vd4 of the pixels arranged in the first to fourth columns and the first row are supplied to the first to fourth image signal lines 171 and the first to fourth data lines 114. Therefore, the correspondence between the pixels designated by the image data Vin and the pixels having the pixel electrodes 118 supplied with the data signals is not broken.

Thereafter, when the sampling signal S2 turns to an H level, the data signals Vid1b to Vid4b are sampled to the fifth to eighth data lines 114 belonging to a block B2, respectively, and are then applied to the pixel electrodes 118 of the pixels arranged in the fifth to eighth columns and the first row, respectively.

Further, in a period where the sampling signal S2 is at the H level, the control signals A1 and A0 are at L and H levels, respectively. However, since signals obtained by performing analog conversion and polarity inversion on the image data Vd1 to Vd4 of the pixels arranged in the fifth to eighth columns and the first row are supplied to the first to fourth image signal lines 171 and the fifth to eighth data lines 114. Therefore, in this period, the correspondence between the pixels designated by the image data Vin and the pixels having the pixel electrodes 118 supplied with the data signals is not broken.

Similarly, when the sampling signals S3, S4, . . . , S288 sequentially turn to H levels, the data signals Vid1b to Vid4b are sampled to four data lines 114 belonging to each of the blocks B3, B4, . . . , B288, respectively, and are then applied to the pixel electrodes 118 of the pixels corresponding to intersections of the first scanning line 112 and the four data lines 114 corresponding to the block of the sampling signal that is at the H level. In this way, the writing of signals onto the pixels arranged in the first row is completely performed without breaking the correspondence with the pixels designated by the image data Vin.

Further, even when the scanning signal G1 turns to an L level to cause all the TFTs 116 arranged in the first row to be turned off, a positive voltage applied to the pixel electrodes 118 is held by the pixel capacitors or the storage capacitors 109 until the scanning signal G1 turns to the H level again.

In the horizontal retrace period, which is the horizontal effective display period where the scanning signal G2 is at an H level, the image data Vin is not supplied. Therefore, the S/P conversion circuit 320 replaces the image data Vd1 to Vd4 with data for making all the pixels to appear to be black. In addition, in the horizontal retrace period, positive writing is changed to negative writing. Therefore, as shown in FIG. 7, for example, the voltage of the data signal Vid1a is changed from a voltage Vb(+) designating the colors of the pixels to black in a positive polarity to a voltage Vb(−) designating the colors of the pixels to black in a negative polarity.

Further, the voltage of the data signal Vid1 shown in FIG. 7 will be described. When applied to the pixel electrodes 118 of the pixels, positive voltages Vb(+), Vw(+), and Vg(+) make the pixels to be displayed in black having a highest gray-scale level, white having a lowest gray-scale level, and gray having a substantially intermediate gray-scale level between black and white. The ranges of the voltages are between the voltage Vc and a high-potential-side power supply voltage Vdd.

When applied to the pixel electrodes 118 of the pixels, negative voltages Vb(−), Vw(−) and Vg(−) make the pixels to be displayed in black, white, and gray. The voltages Vb(−), Vw(−), and Vg(−) and the voltages Vb(+), Vw(+) and Vg(+) are symmetric with respect to the reference voltage Vc, respectively.

In this embodiment, as described above, polarity inversion is performed in the units of scanning lines. Therefore, in the horizontal effective display period where the scanning signal G2 is at an H level, the data signals Vid1a to Vid4a (Vid1b to Vid4b) have negative polarities. Thus, the voltage of the data signal output from the polarity inverting circuit 340 is lowered from the reference voltage Vc by a level designated by the image data Vin (see FIG. 7). The other operations are similarly performed as in the previous horizontal scanning period where the scanning signal G1 is at the H level. In this way, the writing of negative data signals onto the pixels 110 arranged in the second row is completed.

Similarly, when the scanning signals G3, G4, . . . , G864 sequentially turn to H levels, signals are written onto the pixels arranged in the 3rd, 4th, . . . , 864th rows. In this way, positive writing is performed on the pixels arranged in odd-numbered rows, and negative writing is performed on the pixels arranged in even-numbered rows. In one vertical scanning period, writing is completely performed on all the pixels arranged in the 1st to 864th rows.

In the next vertical scanning period, writing is similarly performed. However, in this case, the polarity of signals to be written on the pixels is reversed. That is, in the next vertical scanning period, negative signals are written onto the pixels arranged in the odd-numbered rows, and positive signals are written onto the pixels arranged in the even-numbered rows. In this way, since the polarity of signals to be written onto the pixels is reverse in each vertical scanning period, direct current components are not applied to the liquid crystal 105, which makes it possible to prevent the liquid crystal 105 from being deteriorated.

In this structure, the channel distributing circuit distributes the image data Vd1 to Vd4 immediately after phase expansion, and analog conversion and polarity inversion are performed on the distributed image data. When the impedances of analog paths from the channel distributing circuit to the input terminal, channels, of the rotation circuit 170 of the display panel are different from each other, particularly when the impedances Z1 to Z4 of analog supply lines of the display panel 100 are different from each other, in a structure in which these paths are fixed, for example, in a case in which a large number of pixels are displayed at the same intermediate gray-scale level, a difference in impedance is a difference in the voltages of data signals, which causes four stripes to be periodically displayed, resulting in the deterioration of display quality.

For example, a plurality of analog supply lines for the image data Vd1 to Vd4 are arranged so as to detour the periphery of the sampling signal output circuit 140. In this case, a difference in length between an inner line and an outer line occurs, which causes the impedances Z1 to Z4 of the lines to be different from each other, resulting in the deterioration of display quality.

In contrast, in this embodiment, the channel distributing circuit distributes the image data Vd1 to Vd4 immediately after phase expansion whenever the logical levels of the control signals A1 and A0 change, and analog conversion and polarity inversion are performed on the distributed image data. Then, a path from the channel distributing circuit to the input terminal of the rotation circuit 170 of the display panel is changed, and thus the difference between the impedances of the analog supply paths is averaged. Therefore, in this embodiment, even when the difference between the impedances of the analog supply paths occurs, little display quality is deteriorated.

The combination of the logical levels of the control signals A1 and A0 may be changed in a period where data signals are sampled to four data lines 114 belonging to the same block by shifting the phases of the control signals A1 and A0 every predetermined period (for example, one horizontal scanning period or one vertical scanning period), and analog supply paths for the same pixel or the pixels arranged in the same row may be sequentially changed.

Furthermore, the analog supply paths may be changed randomly, not regularly, in each predetermined period.

Figure 9A:
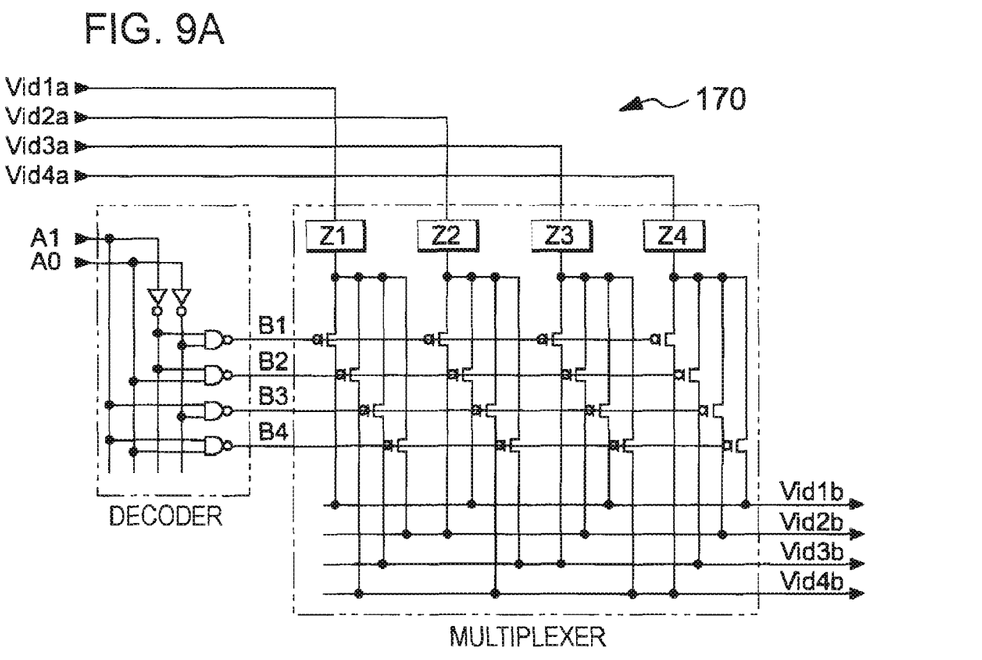
FIGS. 9A and 9B are diagrams illustrating the structure of another rotation circuit of the electro-optical device.

Further, in this embodiment, 16 TFTs of the multiplexer of the rotation circuit 170 are n-channel types. However, as shown in FIG. 9A, the TFTs may be p-channel types. When the TFTs are p-channel types, four NOT circuits for outputting the signals B1 to B4 are not needed.

Figure 9B:
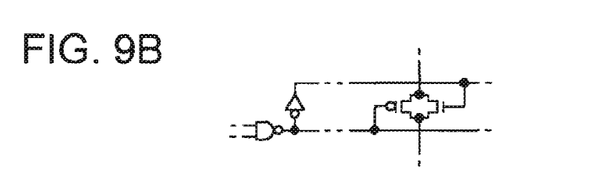

Each of the 16 TFTs may be composed of an n-channel TFT and a p-channel TFT connected in parallel to each other, as shown in FIG. 9B.

In this embodiment, the image data Vin is expanded into four phases, the image data Vd1 to Vd4. However, the number of expanded phases is not limited to four. For example, the number of expanded phases may be two or more. In the above-described embodiment, the processing circuit 50 processes digital image data Vin. However, the processing circuit 50 may process an analog image signal to expand the phase of the processes image signal.

In this embodiment, the voltage LCcom applied to the common electrode 108 is equal to the voltage Vc, which is a reference voltage for polarity inversion. However, since the sampling switch 151 is a thin film transistor which is the same as the TFT 116 for switching the pixel electrode 118, the potential of the drain (the pixel electrode 118) of the sampling switch 151 is lowered (which is called 'push-down', 'punch-through', and 'field-through') due to parasitic capacitance between the gate and the drain of the TFT forming the sampling switch 151, when the sampling switch is turned off. In order to prevent the liquid crystal from being deteriorated, the pixel capacitor should be driven by a direct current. When high-potential (positive) writing and low-potential (negative) writing are alternately performed on the common electrode 108, or when the positive writing and the negative writing are alternately performed with the voltage LCcom equal to the voltage Vc, the push-down causes the effective value of the voltage of the pixel capacitor in negative writing to be larger than that of the voltage of the pixel capacitor in positive writing. Therefore, in some cases, the voltage LCcom of the common electrode 108 is set to be slightly lower than the voltage Vc, which is a reference amplitude of a data signal, such that the effective value of the voltage of the pixel capacitor in positive writing is equal to that of the voltage of the pixel capacitor in negative writing even when the positive writing and the negative writing are performed at the same gray-scale level.

In this embodiment, vertical scanning is performed in the direction from the scanning signal G1 to the scanning signal G864, and vertical scanning is performed in the direction from the sampling signal S1 to the sampling signal S288. However, the scanning directions may be changed in order to cope with a projector or a rotatable display device, which will be described below.

When the effective value of the voltage of the pixel capacitor is small, a normally black mode for performing black display may be executed, instead of the normally white mode for performing white display.

In the above-described embodiment, the TN-type liquid crystal is used. Alternatively, any of the following materials may be used as the liquid crystal: bi-stable liquid crystal having a memory property, such as BTN (bi-stable twisted nematic) liquid crystal or ferroelectric liquid crystal; polymer-dispersed liquid crystal; and GH (guest host)-type liquid crystal which is obtained by dissolving a pigment (guest) having anisotropy in absorbing visible light in a major-axis direction and a minor-axis direction of molecules into liquid crystal having a predetermined molecule arrangement (host) and by arranging dye molecules to be parallel to the liquid crystal molecules.

Further, a vertical (homeotropic) alignment structure may be used in which the liquid crystal molecules are arranged perpendicular to two substrates when no voltage is applied and in which the liquid crystal molecules are arranged parallel to the two substrates when a voltage is applied. In addition, a parallel homogeneous) alignment structure may be used in which the liquid crystal molecules are arranged parallel to the two substrates when no voltage is applied and in which the liquid crystal molecules are arranged perpendicular to the two substrates when a voltage is applied.

Furthermore, in this embodiment, the liquid crystal is used as an electro-optical material, but the invention is not limited thereto. The invention can be applied to various types of liquid crystal and alignment structures.

Further, in this embodiment, the liquid crystal display device is described as an example of an electro-optical device, but the invention is not limited thereto. For example, the invention can be applied to various types of display devices, such as an electro-luminescent (EL) device, an electron emission device, an electrophoresis device, a device using digital mirror elements, and a plasma display device, as long as they can expand the phase of image data (image signals) and change a distribution path to the display panel 100 after the phase expansion.

Figure 10:
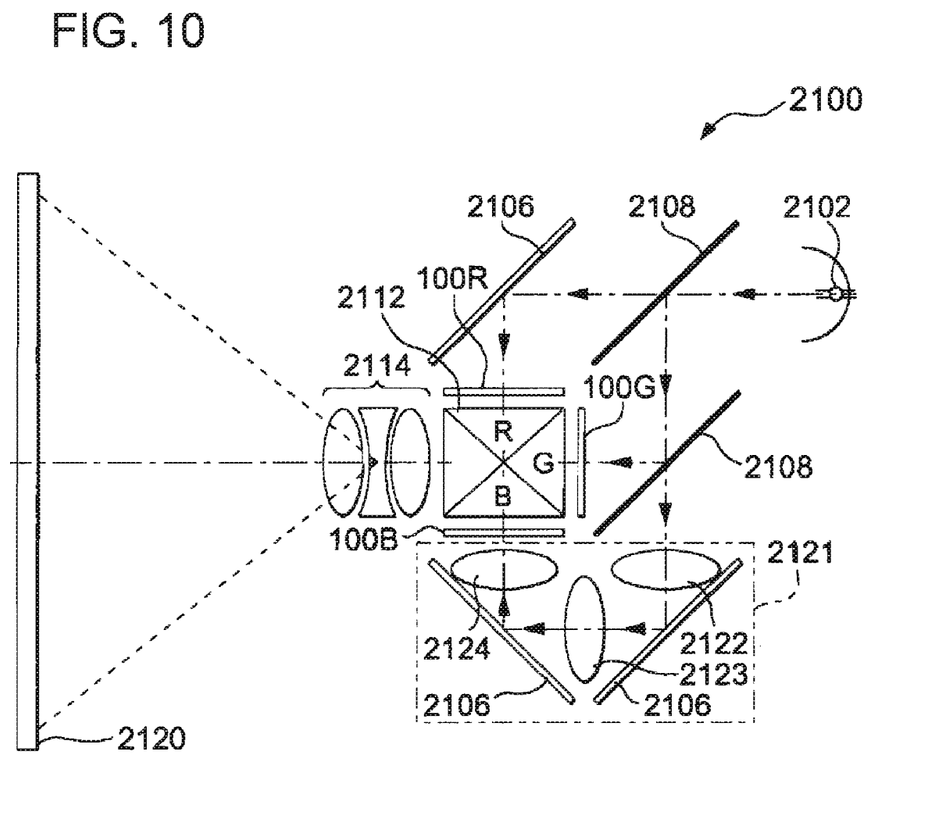
FIG. 10 is a diagram illustrating the structure of a projector to which the electro-optical device is applied.

Next, a projector using the display panel 100 as a light valve is described as an example of an electronic apparatus using the electro-optical device according to the above-mentioned embodiment FIG. 10 is a plan view illustrating the structure of this projector. As shown in FIG. 10, a projector 2100 is provided with a lamp unit 2102 composed of a white light source, such as a halogen lamp. Projection light emitted from the lamp unit 2102 is divided into three primary color beams R (red), G (green), and B (blue) by three mirrors 2106 and two dichroic mirrors 2108 that are provided therein, and the three primary color beams are introduced into light valves 100R, 100G, and 100B corresponding to the primary color beams. Since the B light beam has an optical path longer than those of the R light beam and the G light beam, the B light beam is introduced via a relay lens system 2121 composed of an incident lens 2122, a relay lens 2123, and an emission lens 2124 in order to prevent optical loss.

The structure of the light valves 100R, 100G, and 100B is the same as that of the display panel 100 according to the above-mentioned embodiment, and the light valves 100R, 100G, and 100B are respectively driven by R, G, and B image signals supplied from a processing circuit (not shown in FIG. 10). That is, in the projector 2100, three electro-optical devices each including the display panel 100 are provided so as to correspond to the colors R, G, and B.

Light beams modulated by the light valves 100R, 100G, and 100B are incident on a dichroic prism 2112 in the three directions. In the dichroic prism 2112, the R light beam and the B light beam are reflected at an angel of 90°, while the G light beam travels straight. After R, G, and B images are synthesized into a color image, the color image is projected onto a screen 2120 through a projection lens 2114.

Since the R, G, and B light beams are incident on the light valves 100R, 100G, and 100B through the dichroic mirrors 2108, respectively, it is not necessary to provide color filters. The images passing through the light valves 100R and 100B are reflected by the dichroic mirror 2112 and are then projected onto the screen, while the image passing through the light valve 100G is directly projected onto the screen. Therefore, the horizontal scanning directions by the light valves 100R and 100B are opposite to the horizontal scanning direction by the light valve 100G, thereby displaying a mirror image.

In addition to the electronic apparatus described with reference to FIG. 10, the electro-optical device according to the invention can be applied various electronic apparatuses, such as a television set, a view-finder-type and monitor-direct-view-type videotape recorder, a car navigation system, a pager, an electronic organizer, an electronic calculator, a word processor, a workstation, a television phone, a POS terminal, a digital still camera, a cellular phone, and apparatuses provided with touch panels.

What is claimed is:

1. An electro-optical device comprising:
   a plurality of scanning lines;
   a plurality of data lines which are divided into blocks each composed of m data lines (m is an integer equal to or larger than 2);
   pixels corresponding to intersections of the plurality of scanning lines and the plurality of data lines;
   a scanning line driving circuit which selects at least one of the scanning lines in a horizontal scanning period;
   a sampling signal output circuit which outputs sampling signals for sequentially selecting the blocks in the horizontal scanning period;
   a rotation circuit which receives data signals corresponding to m pixels corresponding to the selected scanning line and the data lines belonging to the selected block and distributes the data signals to m image signal lines according to a correspondence prescribed by one or more predetermined control signals; and
   sampling switches each of which is provided to the data line and samples the data signals distributed to the m image signal lines to the m data lines belonging to the selected block on the basis of the sampling signal,
   wherein the rotation circuit includes:
   a decoder which detects m combinations of logical levels of the one or more control signals;
   a multiplexer which distributes the data signals corresponding to the m pixels to the m image signal lines as m different signals according to the result detected by the decoder.

2. The electro-optical device according to claim 1,
   wherein the multiplexer includes m-by-m transmission gates.

3. The electro-optical device according to claim 2,
   wherein each of the transmission gates is a p-channel or n-channel transistor, or a parallel circuit of the p-channel transistor and the n-channel transistor.

4. The electro-optical device according to claim 1,
   wherein the correspondence prescribed by the one or more control signals is changed according to a predetermined rule.

5. The electro-optical device according to claim 1,
   wherein the correspondence prescribed by the one or more control signals is changed randomly.

6. The electro-optical device according to claim 1,
   wherein dummy image signal lines are provided at both sides of the m image signal lines.

7. A method of driving an electro-optical device including a plurality of scanning lines, a plurality of data lines which are divided into blocks each composed of m data lines (m is an integer equal to or larger than 2), and pixels which are provided at intersections of the plurality of scanning lines and the plurality of data lines and each of which emits light at a gray-scale level designated by a data signal sampled to the data line when the scanning line is selected,
   the method comprising:
   selecting at least one of the scanning lines in a horizontal scanning period;
   outputting sampling signals for sequentially selecting the blocks in the horizontal scanning period;
   inputting the data signals to m pixels corresponding to the selected scanning line and the data lines belonging to the selected block, detects m combinations of logical levels of one or more control signals using a decoder and distributing the input data signals corresponding to the m pixels to m image signal lines as m different signals according to the results detected by the decoder and according to a correspondence prescribed by one or more predetermined control signals using a multiplexer; and sampling the data signals distributed to the m image signal lines to the m data lines belonging to one block on the basis of the sampling signal.

8. An electronic apparatus comprising the electro-optical device according to claim 1.

* * * * *